United States Patent [19]

Sundberg

[11] Patent Number: 5,029,251
[45] Date of Patent: Jul. 2, 1991

[54] TRANSDUCER FOR MEASURING ANGLES OF INCLINATION, ANGULAR POSITIONS AND OTHER POSITIONS, AND APPARATUS COMPRISING SUCH TRANSDUCER

[76] Inventor: Rune Sundberg, Lillebovägen 22, S-191 44 Sollentuna, Sweden

[21] Appl. No.: 506,088

[22] Filed: Apr. 9, 1990

[51] Int. Cl.[5] .......................... G01D 5/34; G01C 1/10; G01C 1/00

[52] U.S. Cl. ................................ 250/231.1; 356/149; 33/283

[58] Field of Search .................... 356/138, 149, 150; 250/231.11, 231.13, 237 G, 231.10

[56] References Cited

U.S. PATENT DOCUMENTS 3,723,011 3/1973 Flory et al. ...................... 250/231.1
4,110,609 8/1978 Beer ................................ 250/231.1

FOREIGN PATENT DOCUMENTS 334752 5/1971 Sweden .
401856 9/1976 Sweden .
401264 12/1976 Sweden .

*Primary Examiner*—David C. Nelms
*Assistant Examiner*—LaCharles P. Keesee
*Attorney, Agent, or Firm*—Oblon, Spivak, McClelland, Maier & Neustadt

[57] ABSTRACT

A transducer is employed for measuring angles of inclination, angles of up to about 180° and rectilinear positional changes according to a new electrooptical principle based on the fact that the flows of radiation emitted by two sources of radiation and measurable by means of a radiation-sensitive element are dependent on the angular position of a screen element. The primary function of the transducer is to perform accurate measurements of angular positions. To this end, the invention is conceived so as to eliminate or reduce the influence of all significant sources of error on the measuring result. This is achieved by using special radiation-sensitive elements for sensing and correcting operational changes and through the system design. For optimal utilization of the transducer, it further comprises a microprocessor from which the measuring result is obtained as a high-resolution digital signal. The transducer is especially useful for measuring angles of inclination in the horizontal and vertical planes, as well as all intermediate inclinations.

11 Claims, 3 Drawing Sheets

FIG._1
FIG._2
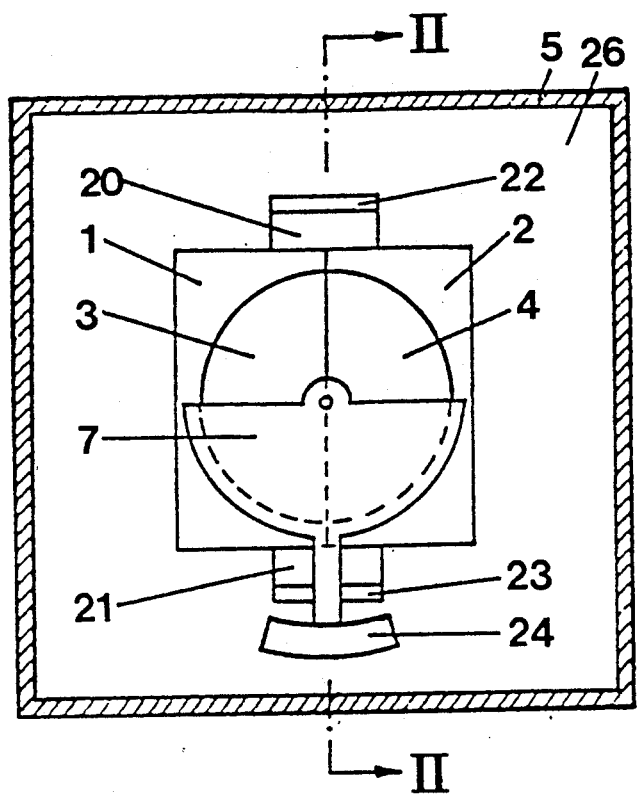
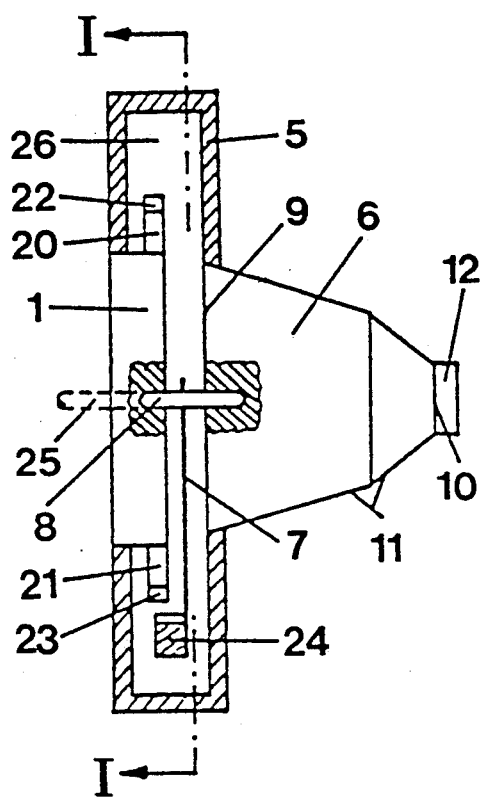
FIG._3
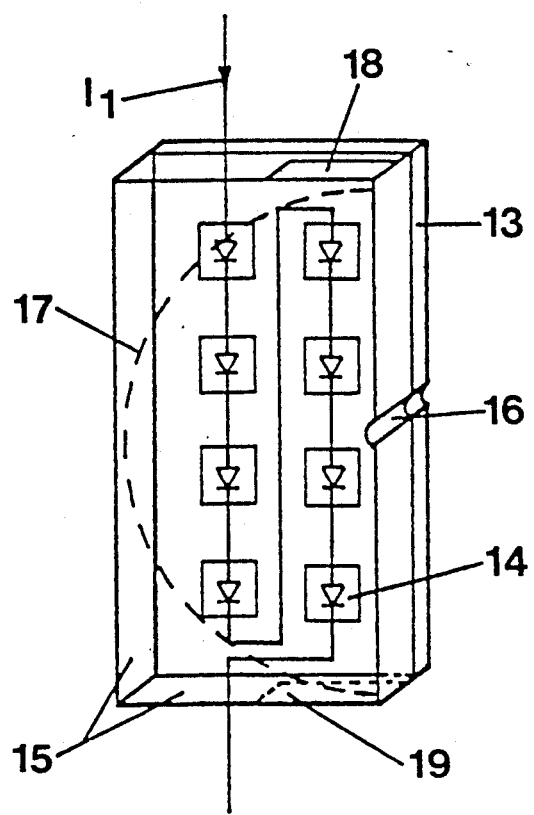

FIG._4
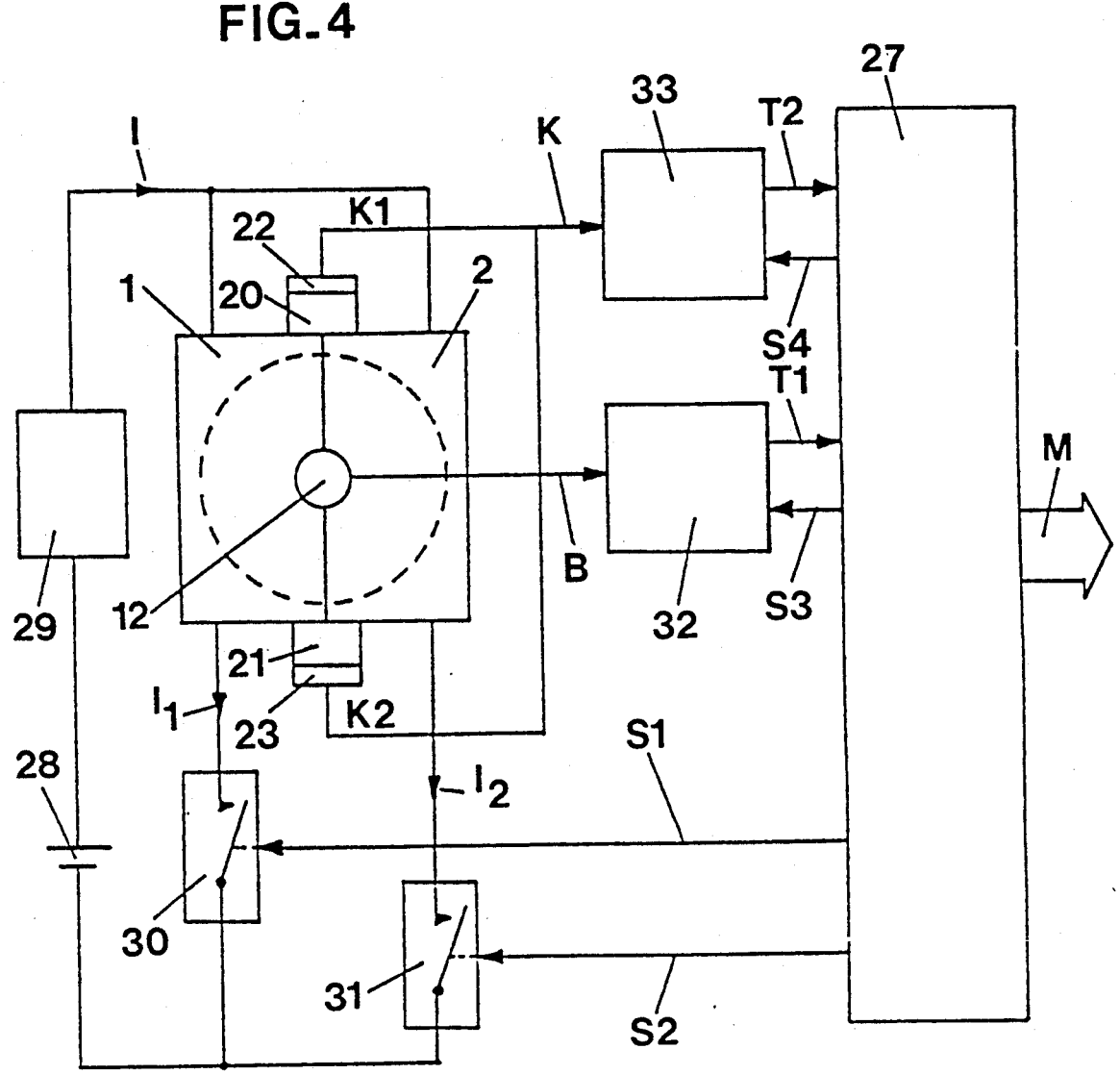
FIG._5
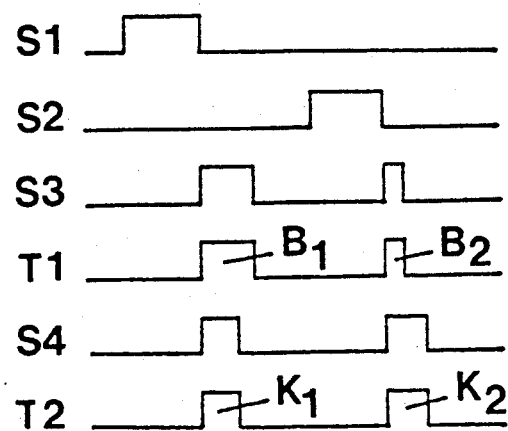

TRANSDUCER FOR MEASURING ANGLES OF INCLINATION, ANGULAR POSITIONS AND OTHER POSITIONS, AND APPARATUS COMPRISING SUCH TRANSDUCER

The present invention relates to a transducer for measuring angles of inclination, angular positions and other positions. More specifically, the invention relates to a transducer for accurate measurement of an angular inclination by means of electrical, optical and mechanical techniques in combination. The invention also relates to an apparatus comprising such a transducer.

Measurements of angles, and especially angles of inclination are often carried out under severe environmental conditions, which may give rise to error contributions adversely affecting the measuring results. The environmental factor generally giving the largest error contribution are temperature variations. Measurements of angles and angles of inclination are often carried out in environments where severe temperature conditions prevail. This is the case, e.g. in building and road construction, on oil-rigs, in deep-drilling for gas and oil, in wind power stations, on different kinds of ships, and on light and heavy vehicles. In most cases, the measurements are conducted outdoors and under varying temperature conditions.

The most general method for inclination measurements relies on some type of liquid-filled level. One example of this is the water-level. Electrooptical methods in combination with levels however also exist. One example of this is disclosed in Swedish patent 401856. Methods for electrooptic sensing of pendulum devices or the like are described, e.g. in Swedish patents 334752 and 401264.

These methods generally suffer from the limitation of permitting inclination measurements only within a restricted range and especially in the horizontal or vertical plane. For extending the measuring range, use is sometimes made of balanced systems where a stepping motor is employed for balancing the transducer to zero position. By counting pulses to the stepping motor, it is possible to determine the angle of inclination concerned. Such systems however become unnecessarily complicated and expensive, and the number of sources of error adversely affecting the measuring result increases. Moreover, these methods are not entirely insensitive to fluctuations in the ambient temperature, the voltage or the components included in the equipment, or to other factors on which the equipment is dependent.

Since no satisfactory solution has hitherto been found to offset the limiting factors mentioned above, the present invention now aims at solving these problems in a new way.

The basic objective of the invention has been to provide a transducer for measuring angles of inclination, angular positions and other positions, which has an extended measuring range and provides good stability, minimal inaccuracy and high resolution, and in which aging factors of components included do not affect the measuring result. One object of the invention therefore is to provide a transducer which is adapted to completely eliminate or reduce the influence of all significant sources of error on the final measuring result. Another object of the invention is to provide a transducer for measuring an angle of inclination, in which the measured angle is converted into an electric signal. Yet another object of the invention is to provide a transducer for measuring an angle of inclination in the horizontal plane and the vertical plane, as well as all intermediate angles of inclination. Such a transducer in combination with a straightedge can be used as a conventional water-level, but has an extended measuring range. Another important object of the invention is to provide an optimal technical and economical solution to the problems stated above.

SUMMARY OF THE INVENTION

The invention relates to an apparatus for measuring angles of inclination, angular positions and other positions. This apparatus comprises a first and a second source of radiation, each having a semicircular radiation-emitting surface. The radiation-emitting surfaces of the two sources of radiation are arranged adjacent each other, such that they together form a circular radiation-emitting surface. The apparatus further comprises a radiation-sensitive element for receiving radiation from the semicircular radiation-emitting surfaces and determining the intensity of the radiation received. Between the circular radiation-emitting surface and the radiation-sensitive element, there is further provided screen means which is rotatable about an axis through the circular radiation-emitting surface so as to screen half of this surface irrespective of the position of rotation. Feed means are provided for alternately feeding the sources of radiation. To the radiation-sensitive element is connected calculating means adapted to calculate the angle of inclination M as $$M = k + k \frac{B_1 - B_2}{B_1 + B_2},$$

where k is a constant set equal to half the measuring range of the apparatus, $B_1$ is the intensity of the radiation from the semicircular radiation-emitting surface of the first source of radiation and $B_2$ is the intensity of the radiation from the semicircular radiation-emitting surface of the second source of radiation. The angular position is transmitted to the screen means by a sensor element suited for each particular application. In inclination measurements, the angular position can be transmitted through a weight which is mounted on the screen means and which by gravity rotates the screen means to a given position, such that the vertical line will pass through the center shaft and the center of gravity of the weight. Angular measurement can be carried out by transmitting the angular position through the center shaft, it being possible to conduct measurements within an angular measuring range of up to about 180°. Rectilinear positional changes can be transmitted by means of an arm mounted on the center shaft and actuated at its portion spaced furthest from the center shaft.

In an advantageous embodiment of the invention, the first and the second source of radiation each further have at least one radiation-emitting reference surface. The apparatus then also comprises at least one additional radiation-sensitive element for measuring the radiation from the reference surfaces and determining the intensity of the radiation received, and means for determining a correction factor c which is the quotient of the intensity of the radiation from the reference surface of the first source of radiation and the intensity of the radiation from the reference surface of the second source of radiation, the inclination being determined as $$M = k + k \frac{c \cdot B_1 - B_2}{c \cdot B_1 + B_2}.$$

The light intensity of the radiation emitted from the reference surfaces is linearly correlated with the light intensity of the radiation emitted from the circular radiation-emitting surface. By measuring the intensity of the radiation from the reference surfaces, it is possible by the correction factor c to correct errors occurring in the measuring value if the light intensities of radiation from the two sources of radiation change in relation to each other because of operational fluctuations.

The invention also relates to an apparatus comprising a transducer of the above-indicated type mounted in a straight-edge.

BRIEF DESCRIPTION OF THE DRAWINGS

FIG. 1 shows the transducer from in front in a section taken along the line I—I in FIG. 2.

FIG. 2 shows the transducer from the side in a section taken along the line II—II in FIG. 1.

FIG. 3 shows a source of radiation having eight light-emitting diodes.

FIG. 4 is a block diagram of a transducer system.

FIG. 5 is a time diagram of control and measuring signals between transducer and microprocessor.

DESCRIPTION OF A PREFERRED EMBODIMENT

Figure 6:
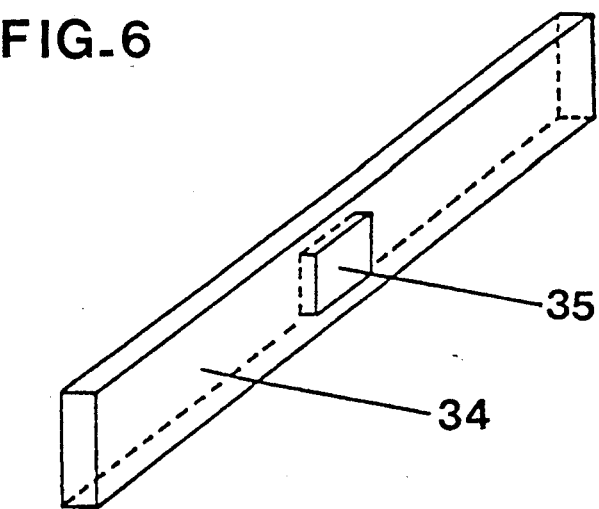
FIG. 6 shows an inclination transducer combined with a straight-edge.

The invention will be described in more detail hereinbelow with reference to the accompanying drawings.

The transducer shown in FIGS. 1 and 2 comprises a first source of radiation 1 and a second source of radiation 2. Each source has a semicircular radiation-emitting surface 3, 4. The two surfaces are disposed close to each other and together form a common circular surface for emitting optical radiation. The sources of radiation are accommodated in a housing 5 in which a circular light guide 6 and a semicircular screening disk 7 are also mounted. The disk is freely rotatable about a center shaft 8 centering the common circular surface of the sources of radiation on the circular light guide 6. The light guide 6, which is made of a plastic material transparent to radiation, collects the radiation from the sources of radiation 1 and 2 at the large circular surface 9, and concentrates and distributes the radiation onto a smaller circular surface 10.

This is achieved by designing the light guide 6 as a double cone, such that the major amount of the radiation incident at right angles or almost at right angles to the surface 9 is totally reflected at the conical surfaces 11 against the surface 10. A minor amount of the radiation near the center passes without any reflexion straight onto the surface 10. The disk 7 screens the semicircular surfaces 3, 4 of the sources of radiation in such a manner that only a semicircular part of the surface 9 is exposed to the radiation. By the design of the light guide, the radiation will however be very evenly distributed over the entire surface 10. A radiation-sensitive element 12 which consists of a photodiode converting the radiation into electric current is provided at the surface 10.

FIG. 3 shows in more detail the first source of radiation 1. At its rear side, there is provided a base plate 13 on the front side of which eight light-emitting diodes 14 in the form of small thin chips are mounted. These are connected in series to ensure that all light-emitting diodes are supplied with the same current i. The base plate 13 is framed by radiation-proof walls 15 enclosing the long sides and the short sides of the base plate. The space between the base plate 13 and up to the front edges of the walls 15 is filled with diffused epoxy plastic distributing the radiation from the light-emitting diodes 14 in such a manner that the radiation is very evenly distributed over the entire surface at the front side of the source of radiation. Further, there is a recess 16 for the center shaft 8. At the front side of the source of radiation, there is provided a radiation-proof screen defining a surface along a circular line 17 so as to form a semicircular surface 3 for the emission of radiation. At their short sides, the enclosing walls 15 have openings forming two minor surfaces 18, 19 for the emission of radiation. Since the radiation from these surfaces and the radiation from the semicircular surface emanate from the same light-emitting diodes, the intensity of radiation from these surfaces becomes linearly correlated with each other with small inaccuracy.

The second source of radiation 2 in FIG. 1 is designed in the same way as the first 1, but in mirror-inverted fashion, the two semicircular surfaces and the four minor surfaces at the short sides forming pairs of major surfaces for the emission of radiation. The two sources of radiation 1, 2 are tightly joined with a strong thermal coupling, thus equalizing temperature differences between the sources which will thus operate under as equal conditions as possible.

Sources of radiation suitable for this purpose are commercially available, e.g. from the following manufacturers.

Hewlett Packard: Type HLMP 2685
Siemens: Type OLB 2685

These sources of radiation must however be modified in certain respects before being usable. The minor surfaces 18, 19 at the short sides must be exposed. Since, in general, the front side where radiation is emitted is not sufficiently planar, surface grinding thereof may be required. Further, a recess 16 must be provided for the center shaft. The sources emit light radiation of a wavelength of about 630 nm.

FIGs. 1 and 2 illustrate two minor light guides 20, 21 disposed at the short sides of the sources of radiation at the minor surfaces 18, 19 for the emission of radiation. At each light guide, there is provided a radiation-sensitive element 22, 23 consisting of photodiodes which convert radiation into electric current. The light guides 20, 21 consist of a diffused plastic material scattering the radiation in such a manner that the radiation emitted from each source of radiation is distributed across the entire radiation-sensitive surface of the photodiodes 22, 23.

The screening disk 7 can be rotated about the center shaft 8 so as to screen more or less of the flow of radiation from the surfaces 3, 4. This rotary movement can be transmitted by the weight 24 when measuring an angle of inclination, or by the extended center shaft 25 when measuring an angular position. Especially in inclination measurements, a damping liquid 26 can be contained in the housing 5 for damping oscillating movements or vibrations which may occur in certain measurements. This also makes it possible to replace the weight 24 with a float transmitting the rotary movement to the disk 7. When measuring rectilinear positions, use may be made of an arm (not shown) mounted on the center shaft 25. This arm should be affected by the measured position at its portion spaced furthest from the center shaft. The rectilinear position is then transformed into an angular position which can be converted into a rectilinear position in a microprocessor 27 shown in FIG. 4

The block diagram in FIG. 4 shows how the connection to the microprocessor 27 is implemented. The two sources of radiation 1, 2 are alternately supplied with a constant current i which is produced by a common constant current generator consisting of a voltage source 28 and a constant current regulator 29.

In this manner, the sources of radiation will operate under as equal conditions as possible. Controllable switches 30 and 31 each connected to a source of radiation can be used for making and breaking the current. The switches are controlled by the logic control signals $S_1$ and $S_2$ supplied by the microprocessor. The current is alternately supplied to the sources of radiation. If, for example, the signal $S_1$ is given a high level, the switch 30 is closed, and the current $i_1$ flows through the first source of radiation 1 emitting radiation for a predetermined period of time. After a short time lag, the second source of radiation 2 is activated in the same manner and for an equally long period of time. The radiation supplied from the sources of radiation 1, 2 is converted into electric current i in the photodiode 12. This current represents the signal B which is converted in a signal converter 32 into a time pulse $T_1$ supplied to the microprocessor 27 where it controls a counter or a register which through the duration of the time pulse counts a numerical value representing the signal B. In the microprocessor 27, which also includes the required software, all the necessary calculations are made for obtaining a measuring result M as a digital electric signal.

The signal which originates from the first source of radiation 1 is designated $B_1$, and the signal from the second source 2 is designated $B_2$. If, for example, the screening disk 7 is in a position screening the radiation at the lower part of the sources of radiation, and is rotated counterclockwise, the signal $B_1$ will increase and the signal $B_2$ decrease in a corresponding degree. The sum of the signals $B_1+B_2$ will remain constant while the difference $B_1-B_2$ will change proportionally to the angular position of the disk 7.

Provided the flows of radiation emitted by the two sources of radiation are equal, the angular position M concerned may be calculated as follows.

$$M = k + k\frac{B_1 - B_2}{B_1 + B_2} \quad (1)$$

where k is a range factor which should be selected equal to half the measuring range, and $0 < M < 2k$.

However, the condition that the sources of radiation 1 and 2 will emit equally large flows of radiation cannot be guaranteed under all operational conditions. As pointed out above, the transducer is intended to be used in environments where considerable temperature variations may occur. Sources of radiation of the above-mentioned type have a temperature sensitivity affecting the radiation intensity by about 1%/°C., which means that in practical applications there may exist small deviations between the flows of radiation.

This entails an inaccuracy of measurement which is at a maximum in the middle of the measuring range, but which because of the quotient calculation according to equation 1 above, will pass towards zero when approaching one of the two end positions of the measuring range. To ensure that the inaccuracy of measurement becomes small over the entire measuring range, there are provided two photodiodes 22 and 23. These receive radiation at the same time as the previously mentioned photodiode 12. The radiation is converted into two electric currents supplied to a signal converter 33. The sum of these currents represents the signal K. The signal converter 33 is designed in the same way as the previously mentioned converter 32.

If the signal coming from the first source of radiation 1 is designated $K_1$ and the signal from the second source 2 is designated $K_2$, a correction factor c can be calculated as follows.

$$c = \frac{K_2}{K_1} \quad (2)$$

The signals $K_1$ and $K_2$ originate from the two radiation-emitting surfaces located at the short sides of the sources of radiation. Since the semicircular surfaces of the sources of radiation are situated between said two surfaces, the signals $K_1$ and $K_2$ will represent mean values which with small inaccuracy are linearly correlated with the radiation intensity at the semicircular surfaces. The correction factor c can therefore be used for correcting errors occurring if the radiation intensities from the sources of radiation change relative to each other. The angular position M can now be calculated if the correction factor c is inserted in equation 1.

$$M = k + k\frac{c B_1 - B_2}{c B_1 + B_2} \quad (3)$$

Accurate measuring results now presuppose that the following conditions are satisfied in the initial stage, i.e. that the two sources of radiation emit equal flows of radiation from the semicircular surfaces and that the correction factor $c=1$. Probably, none of these conditions is satisfied. The radiation flows from the sources of radiation may be different, for instance because of different temperature sensitivity, differences in material or different manufacturing conditions. For accurate measuring results, it is essential that the radiation flows are balanced with respect to each other to avoid inaccuracies in the middle of the measuring range.

Unbalance in the radiation flows can be offset in the following way. In the initial stage or when calibrating the transducer, the difference between two arbitrary measuring values from each source of radiation should be measured in the vicinity of the middle of the measuring range, so as to obtain one value $\Delta B_1$ and another value $\Delta B_2$. A balance factor b is then calculated on the basis of these values as follows.

$$b = \frac{\Delta B_2}{\Delta B_1} \quad (4)$$

The balance factor b then is a constant which is stored in the memory of the microprocessor for use when calculating the measuring result.

The correction factor c may deviate from the value 1 because the two signals $K_1$ and $K_2$ derive from different sources of radiation which may have different radiation flows. Moreover, the lights guides 20 and 21 may be different, like the areas of the radiation surfaces provided at the short sides of the sources of radiation. These discrepancies can be overcome by dividing, in the initial stage, the correction factor c by its initial value $c_1$, giving $(c/c_1)=1$ initially. The factor $c_1$ then is a constant stored in the memory of the microprocessor and used when calculating the measuring result.

Using the factors b, c and $c_1$ provides very good conditions for making an accurate calculation of the measuring result M as follows.

$$M = k + k \frac{(c/c_1) b B_1 - B_2}{(c/c_1) b B_1 + B_2} \quad (5)$$

wherein

M = measuring result
k = range factor where $0 < M < 2k$
b = balance factor indicating the degree of unbalance between the radiation flows of the sources of radiation according to equation 4
c = correction factor for correcting operational fluctuations according to equation 2
$c_1$ = initial value of c
$B_1$ = signal from source of radiation 1
$B_2$ = signal from source of radiation 2

The photodiode 12 is of a type having small non-linearity, which is necessary for having small inaccuracy since the signal B may have large variations in the signal levels. Since the variations of the signal K are small, no demands for linearity need be placed on the photodiodes 22 and 23.

Suitable photodiodes are commercially available, e.g. from the following manufacturers.
Hamamatsu TV CO, LTD Japan
Photodiode 12: Type S1227 66BR
Photodiodes 22 and 23: Type S1227 16BR These are adjusted to the wavelength of the light radiation emitted from the sources of radiation.

Photodiodes of the types stated above or similar types from other manufacturers have a temperature-depending sensitivity of about 0.2%/° C.

The temperature dependence of the photodiodes does not give any error contribution to the final measuring result since the same photodiode is used alternately for measuring two signals from which a quotient calculation is made. If the signals $B_1$ and $B_2$ are changed proportionally as a result of a change of the sensitivity of the photodiode 12, the calculated final result M in equation 5 will remain unchanged. For the same reason, the correction factor c will remain unchanged upon a change of the sensitivity of the photodiodes 22 and 23 since c is calculated from the quotient of $K_1$ and $K_2$ according to equation 2 above.

Changes of the sensitivity of the photodiodes thus are automatically eliminated and do not affect the measuring result. This also applies to changes in the amplification of the signal converters 32 and 33.

The two signal converters 32 and 33 are designed in the same way and are of the double-integrating current-time converter type. This converter type provides a suppression of the noise in the signals from the photodiodes, giving an increase of the resolution in the measurement. The conversion is carried out such that the signal current from the photodiode is integrated in an analog integrator for a time determined by the control signal S1 or S2 in FIGS. 4 and 5. During this period of time, a capacitor is charged in the integrator. The control signals S3 and S4 then start discharging the capacitor by a constant reference current of a direction opposite to that of the signal current. During the discharge time, time pulses T1 and T2 are generated. The length of these pulses is proportional to that of the signals B and K, respectively. In the microprocessor 27, these pulses are converted into numerical values. The conversion speed can be varied within wide limits and depends, inter alia, on the type of microprocessor used.

It is also possible to use other types of signal converters operating according to other principles. For a very rapid conversion, it may be advantageous to use e.g. signal converters which convert the signal current into a digital electric signal in parallel form. The two signal converters, the microprocessor and its software should be adjusted to the measuring speed and the resolution required for the particular application.

In the transducer, dimensional changes may occur because of changes in the ambient temperature. The common circular surface of the sources of radiation, the screening disk 7 and the circular light guide 6 are centered with respect to each other on the center shaft 8. Thus, no relative change between these parts can occur at the center. Changes of importance occur substantially in the sources of radiation and the circular light guide. In the sources of radiation and the light guide, dimensional changes occur radially and in all directions, counting from the center shaft. In the light guide, dimensional changes also occur in the axial direction. These dimensional changes of the sources of radiation and the light guide may give rise to changes in the signal levels, but this does however not affect the measuring results because of the quotient calculation between the signals mentioned above.

As previously mentioned, the microprocessor 27 is used for controlling different functions and for calculating the final measuring result M and includes the required software. The accuracy of calculation is limited only by the digital resolution and the design of the software. Known systematic errors can be corrected in the microprocessor. Linearity errors can be corrected e.g. with the software where a suitable correction table can be used to that end.

Below are listed the measures taken and the characteristics of the transducer providing a satisfactory solution to the problems stated in the introduction to this specification.

1. Correction of errors occurring if the radiation intensities of the two sources of radiation change relative to each other.
2. The sources of radiation are alternately supplied from a common constant current generator for obtaining equal operational conditions.
3. The sources of radiation have a strong thermal coupling to each other for equalizing temperature differences.
4. The influence of the temperature-depending sensitivity of the photodiodes is eliminated by quotient calculation of the signals.
5. The influence of amplification variations of the signal converters is eliminated by quotient calculation of the signals.
6. Integration in the signal converters suppresses signal noise, which increases resolution.

7. Quotient calculation of the difference and the sum of signals makes the inaccuracy go towards zero when approaching the end positions of the measuring range even if the radiation intensity is not equal in the sources of radiation.
8. Dimensional changes because of temperature changes in the sources of radiation and the circular light guide will be eliminated because of quotient calculation between the signals.
9. Vibrations are damped by damping liquid.
10. Known systematic errors can be corrected in the microprocessor.
11. The microprocessor is able to calculate measuring results with small inaccuracy.
12. Calibration, balancing, resetting to zero etc will be facilitated and carried out in a more reliable way by means of the microprocessor.

An important field of application of the transducer as designed for measuring angles of inclination is to replace the level means of a conventional water-level. FIG. 6 shows a straightedge 34 comprising an inclination transducer 35 integrated in the straightedge 34 in such a manner that when the straightedge is inclined 45° from the horizontal plane, the screening disk 7 should be in the middle of its active range of operation amounting to about 180°.

In this manner, it is possible to measure angles of inclination deviating at least 40° in both directions from the horizontal and vertical planes. Moreover, all angles of inclination can be measured within one of the quadrants formed by these planes.

What I claim and desire to secure by Letters Patent is:

1. Transducer for measuring an angle of inclination, an angular position and other positions, comprising
   a first source of radiation having a semicircular radiation-emitting surface;
   a second source of radiation having a semicircular radiation-emitting surface, said radiation-emitting surfaces being arranged adjacent each other and together forming a circular radiation-emitting surface;
   means for alternately feeding said sources of radiation;
   a radiation-sensitive element for receiving radiation from said semicircular radiation-emitting surfaces and determining the intensity of the radiation received;
   screen means disposed between said circular radiation-emitting surface and said radiation-sensitive element and rotatable about an axis through said circular radiation-emitting surface, so as to screen half of this surface irrespective of the position of rotation; and
   calculating means connected to said radiation-sensitive element and adapted to calculate the angle of inclination M as $$M = k + k\frac{B_1 - B_2}{B_1 + B_2},$$

where k is a constant set equal to half the measuring range of the apparatus, and $B_1$ and $B_2$ are the intensity of the radiation from the semicircular radiation-emitting surface of said first and said second source of radiation, respectively.

2. Transducer as claimed in claim 1, wherein each of said first and said second source of radiation has at least one radiation-emitting reference surface, and wherein the transducer further comprises at least one additional radiation-sensitive element for receiving radiation from said radiation-emitting reference surfaces and determining the intensity of the radiation received, and means for determining a correction factor c representing the quotient of the intensity of the radiation from the reference surface of said first source of radiation and the intensity of the radiation from the reference surface of said second source of radiation, the angle of inclination being determined as $$M = k + k\frac{c B_1 - B_2}{c B_1 + B_2}.$$

3. Transducer as claimed in claim 2, wherein the reference surfaces of said first and said second source of radiation are arranged adjacent each other.

4. Transducer as claimed in claim 2, wherein the area of reference surfaces is smaller than the area of said semicircular radiation-emitting surfaces.

5. Transducer as claimed in claim 2, wherein said first source of radiation has a first and a second reference surface, said second source of radiation having a first and a second reference surface, and wherein said first reference surfaces are arranged adjacent and in thermal contact with each other on one side of said circular radiation-emitting surface, and said second reference surfaces being arranged adjacent and in thermal contact with each other on the other side of said circular radiation-emitting surface.

6. Transducer as claimed in claim 1, further comprising circular radiation-conducting means arranged between said screen means and said radiation-sensitive element.

7. Transducer as claimed in claim 6, further comprising a shaft which extends through the center of said circular radiation-emitting surface and of said circular radiation-conducting means and on which said screen means is rotatably mounted.

8. Transducer as claimed in claim 1, wherein said first and said second source of radiation are thermally coupled to each other.

9. Transducer as claimed in claim 1, further comprising a weight mounted on said screen means for rotation thereof, such that the vertical line will pass through said axis and the center of gravity of said weight.

10. Apparatus for measuring an angle of inclination, an angular position and other positions, comprising a transducer mounted in a straightedge and comprising
    a first source of radiation having a semicircular radiation-emitting surface;
    a second source of radiation having a semicircular radiation-emitting surface, said radiation-emitting surfaces being arranged adjacent each other and together forming a circular radiation-emitting surface;
    means for alternately feeding said sources of radiation;
    a radiation-sensitive element for receiving radiation from said semicircular radiation-emitting surfaces and determining the intensity of the radiation received;
    screen means arranged between said circular radiation-emitting surface and said radiation-sensitive element and rotatable about an axis through said circular radiation-emitting surface, so as to screen half of this surface irrespective of the position of rotation; and calculating means connected to said radiation-sensitive element and adapted to calculate the angle of inclination M as $$M = k + k \frac{B_1 - B_2}{B_1 + B_2},$$

where k is a constant set equal to half the measuring range of the apparatus, and $B_1$ and $B_2$ are the intensity of radiation from the semicircular radiation-emitting surface of said first and said second source of radiation, respectively.

11. Apparatus as claimed in claim 10, wherein the transducer is mounted in the straightedge in such a manner that when the apparatus is arranged at an angle of 45° to the horizontal plane, said screen means is screening an equally large surface of the semicircular radiation-emitting surface of said first source of radiation, and of the semicircular radiation-emitting surface of said second source of radiation.

* * * * *